US007008978B2

(12) United States Patent
Meyers et al.

(10) Patent No.: US 7,008,978 B2
(45) Date of Patent: Mar. 7, 2006

(54) METHOD FOR ADDING INORGANIC ADDITIVES TO FINISHED POLYMER MELTS

(75) Inventors: Franz Meyers, Charlotte, NC (US); Jurgen Kastner, Bochum (DE); Michael Wedler, Duisburg (DE); Peter Weiser, Duisburg (DE)

(73) Assignee: Sachtleben Chemie GmbH, Duisburg (DE)

( * ) Notice: Subject to any disclaimer, the term of this patent is extended or adjusted under 35 U.S.C. 154(b) by 147 days.

(21) Appl. No.: 10/398,790

(22) PCT Filed: Oct. 5, 2001

(86) PCT No.: PCT/EP01/11496

§ 371 (c)(1),
(2), (4) Date: Jun. 2, 2003

(87) PCT Pub. No.: WO02/31042

PCT Pub. Date: Apr. 18, 2002

(65) Prior Publication Data

US 2003/0191221 A1 Oct. 9, 2003

(30) Foreign Application Priority Data

Oct. 13, 2000 (DE) ................. 100 50 91

(51) Int. Cl.
*C08K 9/12* (2006.01)
*C08K 9/10* (2006.01)

(52) U.S. Cl. ............ 523/200; 523/210; 523/351; 524/98; 524/249; 524/275; 524/377

(58) Field of Classification Search ........... 523/200, 523/210, 351; 524/98, 249, 275, 377

See application file for complete search history.

(56) References Cited

U.S. PATENT DOCUMENTS

| 3,496,133 | A | * | 2/1970 | Hoffman ................ 523/351 |
| 4,183,843 | A | * | 1/1980 | Koenig et al. ............ 523/216 |
| 5,075,354 | A | * | 12/1991 | Mitsuuchi et al. ......... 523/217 |
| 5,534,585 | A | * | 7/1996 | Roulstone et al. ......... 524/497 |
| 5,648,407 | A | | 7/1997 | Goetz et al. |
| 6,025,075 | A | * | 2/2000 | Grant et al. .............. 428/403 |
| 6,635,694 | B1 | * | 10/2003 | Meyers et al. ............ 523/340 |

FOREIGN PATENT DOCUMENTS

| DE | 19839840 A1 | * | 3/2000 |
| DE | 198 398 56 A | | 4/2000 |
| EP | 0 236 945 B1 | | 9/1987 |
| EP | 0 794 222 A | | 9/1997 |

OTHER PUBLICATIONS

USPTO obtained Derwent machine translation of JP 9-227768-A (Sep. 2, 1997).*
USPTO obtained translation of DE 19839840-A1 (Mar. 9, 2000), Meyers et al.*
Ginestar, Jose, "Pigments as Photoprotectants" issued Feb. 2003, downloaded from the internet at http://www.thecosmeticsite.com/formulating/suncare/959671.html.*
Chem. Abst. Serivce.—Miyashita, Susumu et al "Polyester coloring compositions . . . and films", & JP 09 227769 A (Toyo Ink Mfg. Co. Ltd. JP Sep. 2, 1997.

* cited by examiner

Primary Examiner—Matthew A. Thexton
(74) Attorney, Agent, or Firm—Fulbright & Jaworski L.L.P.

(57) ABSTRACT

A process is described for the modification of polymer melts by means of finely divided inorganic solid particles (melt modification process), in which a powdery additive which contains the inorganic solid particles with a maximum particle size of 1 $\mu$m embedded in finely divided form in a matrix of an organic substance, the organic substance containing one or more of the substances from the group consisting of polyols, polyglycols, polyethers, dicarboxylic acids and derivatives thereof, AH salt, caprolactam, paraffins, phosphoric acid esters, hydroxycarboxylic acid esters and cellulose, is incorporated into the polymer.

12 Claims, No Drawings

METHOD FOR ADDING INORGANIC ADDITIVES TO FINISHED POLYMER MELTS

The invention relates to a process for the addition of inorganic additives to finished polymer melts.

Various functional inorganic additives are employed for the modification of polymers, of which polyester, polyamide 6 and polyamide 6.6 are to be mentioned in particular here. Suitable polymers can be altered in respect of processing, optical and use properties by these additives. In the synthetic fibres industry e.g. matting agents are used to avoid greasy shine, which is above all undesirable for textile fibres, and to eliminate the transparency of the polymers. Microcrystals of titanium dioxide $TiO_2$ or zinc sulfide ZnS are employed for this purpose. The use of these microcrystals furthermore produces on the synthetic fibres a surface structure which has a positive influence on the processing properties in respect of the friction of the thread on thread guide elements and the thread run during spinning and stretching. However, microcrystals of after-treated barium sulfate, $BaSO_4$, which, in contrast to $TiO_2$ and ZnS, do not lead to matting of the polymers can also be used for this purpose. Another example is the use of nanocrystals of titanium dioxide to prepare polymers with UV-protecting properties.

So that the desirable effects which can be achieved with the individual additives can become clear, the technology of the addition of the additives to the polymer is to be ascribed particular importance. In principle, there are three addition possibilities:

1. Addition of the additives to the raw materials for the preparation of the polymer, i.e. before the actual formation of the polymer
2. Addition of the additives during the polymer formation process
3. Addition of the additives to the finished polymer melt, i.e. after the end of the chain growth Possibility 3 (addition of the additives to the finished polymer melt, also called melt modification process or melt matting process) is described e.g. in DE 4039857 C2 and can be divided into 3 variants.

The end product (additive-containing polymer) with the melt modification process, is prepared directly by incorporation of the additives into the polymer.

With the melt modification process, a so-called masterbatch (premix of polymer and additive with an increased additive concentration relative to the end product) is prepared by incorporation of the additives into the polymer (by e.g. an extruder or kneader).

The end product with the melt modification process is prepared by incorporation of a masterbatch into the polymer.

However, the melt modification process has the following disadvantages:

The additives (inorganic solid particles) are incorporated as powders into the finished polymer melt. To establish the solids content desired in the polymer, a uniform metering of the powder is necessary above all. Good to very good flow properties for the powder are a prerequisite of this. The powders based on $TiO_2$, $BaSO_4$ and ZnS which are employed all show poor flow properties and can lead to undesirable bridge and tunnel formation in the powder feed system. It has been found (measurements with a ring shear apparatus) that these powders are to be classified as very cohesive to non-flowing. Substantial metering variations are therefore to be expected, during metering of these powders, which would lead to considerable amounts of product which do not meet the specification because of the associated differences in the concentration of solids.

So that the properties of the additives in the polymer can have their full effect, a very good and uniform distribution of the individual particles in the polymer is necessary. The dispersing of the powders in the various melt modification processes and in the preparation of masterbatches is carried out in specially designed extruders. The dispersibility of the powders employed must be so good that the shear forces in these extruders are sufficient to achieve the required particle size distribution in the polymer. The powders based on $TiO_2$, $BaSO_4$ and ZnS which are employed according to the prior art are in agglomerated form as delivered form, i.e. high shear forces have to be applied in order to break down these agglomerates and optimally distribute them. Compared with conventional addition of additives via additive suspensions during the polymer formation process (addition possibility 2), the melt modification processes described give polymer products of poorer quality in respect of particle distribution, because the shear forces for dispersing of the additive suspensions are, as a result of suitable choice of the dispersing machines, higher than in extruders or kneaders.

During further processing of the polymers prepared, the content of additive particles which are too coarse plays a quality-relevant role. During, production of synthetic fibres by spinning and stretching, these particles lead, for example, to an increased number of undesirable thread breaks. At the same time, the service life of polymer filters and spinpack filters is reduced. In the preparation of additive suspensions for addition during the polymer formation process (addition possibility 2), those coarse particles which have not been broken down by the dispersing can be removed from the low-viscosity suspension by centrifugation, sedimentation and/or filtration. After dispersing in an extruder (addition possibility 3), the coarse particles which still remain can no longer be separated off since the necessary filter finenesses cannot be achieved in these high-viscosity polymer melts. That is to say, even after dispersing in an extruder the powders based on $TiO_2$, $BaSO_4$ and ZnS which are employed according to the prior art have an undesirable coarse content which has an adverse influence on the quality of the polymer end products.

Because of these disadvantages, the melt modification process has so far scarcely been accepted in practice, and in most cases the additives are still added during the polymer formation process, even though, in some cases, there must be considerable expenditure on technical means and personnel here for preparation of the additive particles before addition to the melt stream in the formation of the polymer. This includes dispersing the additive particles in the suspension medium, separating off the coarse particle fraction and avoiding reflocculation in the suspension. It must furthermore be ensured that during addition of the prepared suspension to the melt stream there are no flocculation effects, which may occur e.g. by interaction with other additives or by temperature influences.

An object of the invention is to eliminate the disadvantages of the prior art and in particular to provide a process for the modification of polymer melts by finely divided inorganic solid particles (melt modification process) which allows a sufficiently precise measuring out of the additives to be added and which ensures a homogeneous distribution of the additives without an undesirable coarse content in the polymer melt.

The object is achieved by a process for the modification of polymer melts by means of finely divided inorganic solid particles (melt modification process), in which a powdery additive which contains the inorganic solid particles with a maximum particle size of 1 μm embedded in finely distributed form in a matrix of an organic substance, the organic substance containing one or several substances from polyols, polyglycols, polyethers, dicarboxylic acids and derivatives thereof, AH salt (nylon salt, adipic acid-hexamethylenediamine or hexamethyleneammonium adipate), caprolactam, paraffins, phosphoric acid esters, hydroxycarboxylic acid esters and cellulose, is incorporated into the polymer.

The preparation of the powdery additives (preparation agents, matting additives) is described in WO 00/14165 or also in WO 00/14153. The preparation agents (matting additives, powdery additives) for further processing in synthetic polymers, and consisting of finely divided inorganic solids chosen from pigments and/or fillers, are embedded in finely distributed form in a carrier material chosen from at least one of the organic substance polyols, polyglycols, polyethers, dicarboxylic acids and derivatives thereof, AH salt, caprolactam, paraffins, phosphoric acid esters, hydroxycarboxylic acid esters and cellulose. In finely distributed form means that the solid particles are present in non-agglomerated form in an organic matrix. To prepare these powdery additives, 20 to 60 wt. % (based on the total batch of aqueous premix) of the inorganic solids are dispersed in an aqueous premix, which comprises the organic substance in an amount such that the content of organic substance is 0.2 to 50 wt. % (based on the inorganic solids content of the finished powdery additive), the dispersion is then subjected to wet grinding to an average particle size $d_{50}$ of 0.2 to 0.5 μm, the oversize particle content of >1 μm is removed from the suspension and the suspension is dried. The powdery additives obtained have an average particle size of up to 100 μm.

It has been found that because of their very good flow properties (in contrast to finely ground powders employed to date) these powdery additives can, correspondingly, be measured out readily and meet the increased requirements for quantitative regulation in the melt modification process.

Because of the presence of finely distributed, non-agglomerated solid particles, homogeneous distribution of the inorganic solid particles in the polymer melt without high shear forces is furthermore also ensured. The solid particles are released by melting/dissolving of the organic matrix in the polymer melt and are already optimally dispersed and distributed in the polymer by the shear forces present e.g. in extruders. In practice, this means that due to the better dispersing and finer distribution of the additives, their optimum performance (degree of matting, UV protection etc.) is already achieved when a lower amount is employed compared with the prior art.

In the case of the powdery additives prepared according to WO 00/14165 and WO 00/14153, removal of the solid particles which are too coarse (>1 μm) is already integrated into the preparation process, so that if these additives are used in the melt modification process there are clear advantages for the further processing of the polymers: The filter service lives (e.g. polymer filter or spinpack filter) are lengthened and the number of thread breaks in the production of synthetic fibres is reduced.

The inorganic solid particles preferably contain $TiO_2$ and/or $BaSO_4$ and/or ZnS, it also being possible for the solid particles to be after-treated.

The organic substance preferably contains antioxidants (e.g. butylhydroxyanisole or hydroxyanisole) in an amount of up to 0.5 wt. % (based on the amount of organic substance). The organic substance can contain further conventional auxiliary substances and additives. The organic substance preferably contains at least 98 wt. % polyethylene glycol or AH salt or caprolactam, and the organic substance particularly preferably consists of polyethylene glycol or AH salt or caprolactam and up to 0.5 wt. % of an antioxidant.

Polyester or polyamide 6 or polyamide 6.6 is preferably used as the polymer.

The following powdery additive compositions are preferably used for the process according to the invention:

| Solid | wt. % | Organic substance | wt. % | Used for |
|---|---|---|---|---|
| $TiO_2$ | 50–99.8 | polyethylene glycol | 0.2–50 | polyester |
| $TiO_2$ | 50–99.8 | caprolactam | 0.2–50 | polyamide |
| $BaSO_4$ | 50–99.8 | polyethylene glycol | 0.2–50 | polyester |
| $BaSO_4$ | 50–99.8 | caprolactam | 0.2–50 | polyamide |
| ZnS | 50–99.8 | polyethylene glycol | 0.2–50 | polyester |
| ZnS | 50–99.8 | caprolactam | 0.2–50 | polyamide |

Powdery additives with 75 to 85 wt. % inorganic solid and 15 to 25 wt. % organic substance are particularly preferred. A preferred average particle size $d_{50}$ of the inorganic solid embedded in the organic substance is 0.25 to 0.45 μm.

The powdery additive is preferably incorporated into the polymer by means of an extruder or a kneader.

Polyester fibres and polyester films or polyamide fibres and polyamide films, which likewise comprise the inorganic solid particles, can be produced from a polyester or polyamide which comprises inorganic solid particles and has been prepared with the use according to the invention of the powdery additives.

The invention is explained in more detail below with the aid of examples.

EXAMPLE 1

Preparation of a Masterbatch by the Process According to the Invention 625 g of a powdery additive which comprised 500 g (80 wt. %) $TiO_2$ particles with an average particle size $d_{50}$ of 0.3 μm embedded in finely distributed form in a matrix of 125 g (20 wt. %) polyethylene glycol of average molecular weight 2,000 were incorporated in a twin-screw extruder from Leistritz, into 4,375 g of the polymer polyethylene terephthalate (PET from KoSa, type T 86). The concentration of the $TiO_2$ in the PET masterbatch obtained was 10 wt. %. The temperature was set at 270° C. for all the heating zones. The screws used were counter-running and had a diameter of 34 mm. The length was 25 times the diameter (34/25D).

The 10% masterbatch obtained was investigated by means of a pressure filter test. A PF value of 0.5 $cm^2bar/g$ was determined in this.

The determination of the PF value (measurement index of the quality of masterbatches) was carried out as follows: The masterbatch obtained, with a $TiO_2$ content of 10 wt. %, was continuously melted in a Plasti-Corder measuring extruder from Brabender and fed to a 40 μm filter screen by means of a spinning pump. The temperature in all the heating zones was kept constant at 285° C. during this procedure. The pressure built up in front of the filter package was plotted as a graph against time. The end of the measurement is reached when either the pressure reaches 190 bar or 60 minutes have elapsed. The standard for the quality of the masterbatch is the pressure filter test value (PF value), which can be calculated according to the following formula:

$$PF = \frac{(P_{max} - P_0) \cdot F \cdot 100}{T \cdot C \cdot G} [bar \cdot cm^2/g]$$

where:
- $P_{max}$=end pressure [bar]
- $P_0$=pressure during operation [bar]
- F=filter area [cm$^2$]
- T=measurement time [min]
- C=concentration [%]
- G=throughput [g/min]

The lower the PF value, the better the quality of the masterbatches in respect of the distribution of the inorganic solid particles in the polymer.

COMPARATIVE EXAMPLE A 500 g TiO$_2$ particles with an average particle size d$_{50}$ of 0.3 μm (Hombitan® LC-S from Sachtleben Chemie) were incorporated in a twin-screw extruder from Leistritz into 4,500 g of the polymer polyethylene terephthalate (PET from KoSa, type T 86). The concentration of the TiO$_2$ in the PET masterbatch obtained was 10 wt. %. The temperature was set at 270° C. for all the heating zones. The screws used were counter-running and had a diameter of 34 mm. The length was 25 times the diameter (34/25D).

Analogously to Example 1, the PF of this masterbatch was determined as 12.4 cm$^2$bar/g.

The comparison of the PF values (0.5 cm$^2$bar/g in Example 1 according to the invention, 12.4 cm$^2$bar/g in Comparative Example A) clearly shows that the product prepared according to the invention using the process described leads to a better distribution of the inorganic solid particles in the polymer than the product employed according to the prior art.

The invention claimed is:

1. A process for the modification of polymer melts by means of finely divided inorganic solid particles by a melt modification process, wherein a powdery additive which comprises the inorganic solid particles with a maximum particle size of 1 μm embedded in finely distributed form in a matrix of an organic substance, wherein the organic substance is selected from the group consisting of a polyol, a polyglycol, a polyether, a dicarboxylic acid and derivatives thereof, AH salt, a caprolactam, a paraffin, a phosphoric acid ester, a hydroxycarboxylic acid ester and cellulose, is incorporated into the polymer.

2. A process according to claim 1, wherein the inorganic solid particles contain TiO$_2$, BaSO$_4$ or ZnS.

3. A process according to claim 1, wherein the organic substance consists of polyethylene glycol or AH salt or caprolactam and up to 0.5 wt. % of an antioxidant.

4. A process according to claim 1, wherein the polyester or polyamide 6 or polyamide 6.6 is used as the polymer.

5. A process according to claim 1, wherein the incorporation of the additive into the polymer is carried out by an extruder or a kneader.

6. A polymer comprising inorganic solid particles, wherein the polymer is prepared by a process according to claim 1.

7. A polyester comprising inorganic solid particles, wherein the polyester is prepared by a process according to claim 1.

8. A polyester fiber or polyester film comprising inorganic solid particles, wherein the polyester fiber or the polyester film is produced from a polyester according to claim 7.

9. A polyamide comprising inorganic solid particles, wherein the polyamide is prepared by a process according to claim 1.

10. A polyamide fiber or polyamide film containing inorganic solid particles, wherein the polyamide fiber or the polyamide film is produced from a polyamide according to claim 9.

11. A process according to claim 2, wherein the organic substance consists of polyethylene glycol or AH salt or caprolactam and up to 0.5 wt. % of an antioxidant.

12. The process of claim 1, wherein the powdery additive has an average particle size of up to 100 microns.

* * * * *